(12) United States Patent
Dolloff

(10) Patent No.: US 8,260,085 B2
(45) Date of Patent: Sep. 4, 2012

(54) FUSION OF IMAGE BLOCK ADJUSTMENTS FOR THE GENERATION OF A GROUND CONTROL NETWORK

(75) Inventor: John T. Dolloff, Escondido, CA (US)

(73) Assignee: BAE Systems Information Solutions Inc., Arlington, VA (US)

( * ) Notice: Subject to any disclaimer, the term of this patent is extended or adjusted under 35 U.S.C. 154(b) by 721 days.

(21) Appl. No.: 12/469,104

(22) Filed: May 20, 2009

(65) Prior Publication Data

US 2009/0296982 A1    Dec. 3, 2009

Related U.S. Application Data

(60) Provisional application No. 61/130,778, filed on Jun. 3, 2008.

(51) Int. Cl.
*G06K 9/32* (2006.01)
(52) U.S. Cl. .................... 382/293; 382/294; 382/295
(58) Field of Classification Search .................. 382/293, 382/294, 295
See application file for complete search history.

(56) References Cited

U.S. PATENT DOCUMENTS

| | | | | |
|---|---|---|---|---|
| 6,735,348 B2* | 5/2004 | Dial et al. | ...................... | 382/293 |
| 6,757,445 B1* | 6/2004 | Knopp | ........................... | 382/285 |
| 7,339,614 B2* | 3/2008 | Gruber et al. | ............... | 348/218.1 |
| 7,733,961 B2* | 6/2010 | O'Hara et al. | ........... | 375/240.19 |
| 2003/0044085 A1* | 3/2003 | Dial et al. | ...................... | 382/293 |
| 2005/0140784 A1* | 6/2005 | Cho et al. | ....................... | 348/147 |
| 2008/0144972 A1* | 6/2008 | Kang et al. | ..................... | 382/294 |

OTHER PUBLICATIONS

Monograph, John Dolloff, Introduction to Photogrammertic-based Geopositioning, Lesson 1, Issue 12, Public Release Aug. 15, 2007.
Monograph, John Dolloff, Introduction to Photogrammertic-based Geopositioning, Lesson 2, Issue 13, Public Release Oct. 8, 2007.
Monograph, John Dolloff, Introduction to Photogrammertic-based Geopositioning, Lesson 3, Issue 14, Public Release Oct. 8, 2007.
Monograph, John Dolloff, Introduction to Photogrammertic-based Geopositioning, Lesson 4, Issue 15, Public Release Oct. 8, 2007.

* cited by examiner

*Primary Examiner* — Tom Y Lu
(74) *Attorney, Agent, or Firm* — Daniel J. Long; Robert K. Tendler

(57) ABSTRACT

A method for fusion of image block adjustments for the generation of a ground control network constituting a Metric Information Network (MIN). Utilizing the subject. fusion algorithm it is possible to duplicate the results of an extremely large simultaneous image block adjustment by sequentially performing smaller image block adjustments on small overlapping areas of interest and taking the results to update a metric information network. Note, intermediate results for less than all the imagery provide usable updates to the metric information network. The result of the infusion of sequential image block adjustments into the metric information network is that one can obtain the accuracy provided by an extremely large single image block adjustment, and do so in manageable chunks or segments involving conventional computer resources.

7 Claims, 11 Drawing Sheets

FUSION OF IMAGE BLOCK ADJUSTMENTS FOR THE GENERATION OF A GROUND CONTROL NETWORK

RELATED APPLICATIONS

This Application claims rights under 35 USC §119(e) from U.S. application Ser. No. 61/130,778 filed Jun. 3, 2008, the contents of which are incorporated herein by reference.

FIELD OF THE INVENTION

The present invention relates to fusion of image block adjustments for the generation of a ground control network. More particularly the invention relates to such a network wherein ground control points from this network can then be used to control future image block adjustments or other applications requiring control.

BACKGROUND OF THE INVENTION

Image-based Geopositioning Background

As to image block adjustments are ubiquitous in the image-based geo-positioning community. Image block adjustment systems adjust the image support data (estimates of sensor position, velocity, attitude, etc.) of a block of images with overlapping ground footprints in order to achieve better accuracy and consistency in the subsequent exploitation of that imagery. Typical images are from commercial satellite sensors and are available to the public, each image covering an approximate 10 mile wide by 20-100 mile long area of the earth's surface.

"Target extraction" is a common form of image exploitation. It estimates the three-dimensional geo-location (e.g. latitude, longitude, elevation above the earth's surface) of objects and features identified and measured in the images. A prediction of corresponding accuracy is also provided. Target extraction algorithms typically involve either a few overlapping images or one image with external elevation or height information, whereas the image block adjustment or adjustments which proceed them normally involve tens of overlapping images. FIG. 1 conceptually illustrates a two-image (stereo) target extraction (accuracy prediction not shown), where the target is measured in both images and its geo-location estimated. Note that the locations and orientations of the depicted images correspond to the sensor position and attitude. The more accurate the sensor position and attitude are known, the more accurate the geo-location of the extracted ground point.

The primary inputs to an image block adjustment are the image support data to be adjusted and two-dimensional image measurements of various ground tie points identified in the overlapping images. When available, the set of ground points also includes ground control points with well known geo-locations, typically accurate to within a few meters and sometimes to within one-half meter, and corresponding accuracy predictions. If enough ground control points are available, their proper use in an image block adjustment insures subsequent image support data adjustment accuracy on the order of the ground control point accuracy; which in turn insures subsequent target extractions with the same order of accuracy. The primary outputs from an image block adjustment are the adjusted image support data, the adjusted geo-locations and the predicted accuracy of the ground points involved. A detailed description of image exploitation and image block adjustment, also known as triangulation or image registration, is included in E. Mikhail, J. Bethel, and C. McGlone, *Introduction to Modern Photogrammetry*, John Wiley & Sons, 2001, as well as in C. McGlone, *Manual of Photogrammetry*, American Society for Photogrammetry and Remote Sensing, 2004, the contents of which are incorporated herein by reference.

Network Generation Overview

Currently, ground control points are primarily generated by surveying ground points on or near the earth's surface, typically with a GPS receiver. However, this an expensive process as it requires travel to the point with appropriate equipment and personnel. Also, access to the desired location may be restricted.

Another possible method to generate ground control points is to obtain a block of images over the desired area of interest, perform an image block adjustment, and then mathematically extract ground points using the adjusted image support data. However, these ground points are not accurate enough to serve as ground control points because they were generated from the information from only a single block of images, i.e., from a single image block adjustment with no access to surveyed ground control points. Although there is some information in the image block itself, there is not enough information unless the image block is extremely large, i.e., contains up to thousands and thousands of overlapping images, in which case the corresponding image block adjustment is virtually impossible to perform, i.e. too unwieldy and time consuming. Note that an image block adjustment averages and hence reduces image support data errors via the common ground tie points measured in the overlapping images.

In summary, currently it is virtually impossible to obtain ground control points over an arbitrary area of interest, and the process to obtain them over a specific area of interest is very expensive.

SUMMARY OF THE INVENTION

The subject method can generate ground control points over an arbitrary area of interest in a practical and inexpensive manner. The subject invention relies on the sequential processing of individual image blocks, i.e. a series of image block adjustments and an underlying fusion algorithm. The subsequent ground control points generated after the processing of the nth image bock are equivalent to those generated by a hypothetical simultaneous n-image block adjustment. However, the subject invention is much more practical, efficient, and orders of magnitude faster than a simultaneous block adjustment approach.

The area covered by the ground control network can range from a few square miles using images from commercial or tactical airborne sensors to the size of countries or continents using commercial satellite images with individual footprints up to 25 km×200 km and larger. The actual size of the network depends on the application, and specifically, on the number of image block adjustments and the size of their ground footprints. The ground footprint of an applicable image block adjustment resides within the area of interest. Collectively, the ground footprints from a series of applicable image block adjustments eventually cover the entire area with a degree of redundancy. Note that the images can correspond to a mix of sensors and sensor types both within an image block adjustment and across image block adjustments. Also, today, commercial satellite imagery can be obtained covering virtually any area of interest.

The resulting network can be accessed for applicable ground control points by various applications throughout its generation process According to the present invention, the contents of the corresponding ground control network include: (1) three-dimensional geo-locations of the ground control points, (2) image patches containing the ground control points for aiding in their subsequent identification and measurement in other images, (3) the multi-ground control point error covariance matrix or its equivalent applicable to all the ground control points in the network, and (4) various ancillary metadata.

Note that the network can also include "external" ground control points, i.e., those not generated with image block adjustments, such as surveyed (GPS) points. The network generation process will automatically "propagate" their information to all other ground point in the network, such that their accuracy will be on the order of the surveyed ground control point accuracy.

The term "Metric Information Network", or "MIN", is used herein for the corresponding ground control network to emphasize its key characteristics: (1) the network can be thought of as an efficient "storage vessel" for the metric geo-positioning information available in a collection of heterogeneous imagery and corresponding support data, (2) by virtue of its generation technique, the ground control points are not only accurate but consistent across the entire network resulting in good relative accuracy, and (3) the network includes a reliable estimate of the absolute and relative accuracy of all point and point pairs in the network via a multi-ground point error covariance. The actual data contents of the MIN are assumed stored in a "MIN Repository".

More specifically, in one embodiment, the subject invention is a method for fusion of image block adjustments for the generation of a ground control network comprising the steps of: providing a plurality of image blocks including a first image block, each image block having a plurality of images generated from airborne or space borne sensors; providing an image block adjustment of the first image block to solve for improved image support data and geo-coordinates of the ground tie points measured in the images to create adjusted tie point ground coordinates with error covariance; incorporating the adjusted tie point ground coordinates and their error covariance as new ground control points into the ground control network that is being generated; providing a second image block which partially overlaps the first image block and then measuring ground tie points in the second image block and bringing in any ground control points from the ground control network that can be measured in the images of the second image block; performing an image block adjustment of the second image block, taking the adjusted tie points and their error covariance and placing these points and their error covariance into the ground control network as new ground control points; and within the ground control network replacing the ground control points used in the second image block adjustment with their adjusted counterparts and error covariance, and then updating all other ground control points currently in the ground control network with the subject underlying fusion algorithm. Note that the above processing description assumed that the MIN was empty at receipt of the first image block.

The above "two stage" fusion process continues as each image block is received, and is summarized as follows for a new image block. "Stage 1" performs the standard image block adjustment applicable to the new image block, and "Stage 2" implements the underlying fusion algorithm that updates all ground control points in the MIN, including those not involved in Stage 1. Stage 1 utilizes any ground control points already in the MIN (Repository) that can be measured in the new image block as ground control points for the corresponding image block adjustment. These ground control points were generated by the earlier sequential processing of previous image blocks. After Stage 1 processing is complete for the new image block, the adjusted ground control points and ground tie points are then output. The adjusted ground control points are more accurate than when they were input into the Stage 1 adjustment since they now incorporate the independent information inherent in the new image block and its support data via the image block adjustment. The adjusted tie points are also approximately as accurate as the adjusted ground control points via the image block adjustment process.

Stage 2 then updates the MIN (Repository) using the outputs of Stage 1. Specifically, the adjusted ground tie points are directly inserted into the MIN Repository as new ground control points. Also the adjusted ground control points replace their unadjusted counterparts in the MIN Repository. And finally, all other ground control points in the MIN Repository are updated and improved as well by the underlying fusion algorithm. Note that Stage 2 and its underlying fusion algorithm not only expands the number of ground control points and updates their locations, it also expands and updates their corresponding error covariance as well.

The underlying fusion algorithm transforms the improvements in the adjusted ground control points that participated in the Stage 1 image block adjustment to corresponding improvements to the other ground control points in the MIN Repository. This is described in the following three paragraphs.

Prior to Stage 1, the two groups of ground control points are related. More precisely, the errors in their estimated locations are related; that is, to some degree, common. They are related because both groups of points were adjusted together in previous Stage 1 image block adjustments. In these earlier adjustments, the dominant error that affected both groups of points was common image support data error. For example, an error in the unadjusted (a priori) location of where the sensor was when an image was taken affects the three-dimensional locations of all ground points measured in this image by nearly the same amount via the corresponding image block adjustment. If the sensor's location was in error 5 meters to the North, the adjusted ground points will have nearly a common error of approximately 5 meters to the North as well due to sensor location error. In this case, correlation between ground points is nearly 1 (or 100%), where, in general, it can vary between −1 and 1.

Note that the amount of error for each ground point location in the MIN Repository is statistically quantified by the appropriate entries in the multi-ground point error covariance contained in the MIN Repository. This error covariance also quantifies the degree to which these errors are related, or correlated, between points.

The new Stage 1 image block adjustment brings in independent information from the new imagery and its support data which improves the locations of ground control points from the MIN Repository that can be measured in the images, i.e., for those that participated directly in the Stage 1 adjustment. The difference in their location going into the adjustment and coming out of the adjustment is a direct measure of this new information and is in the form of corrections to their previous location errors. But because their previous locations errors are also related to the location errors of the other ground points in the MIN Repository which did not participate in the image block adjustment, the underlying fusion algorithm "multiplies" these corrections by the appropriate correlations in the multi-ground point error covariance to provide corrections to the other ground control points as well. Note that the multi-ground point error covariance is also updated.

With the above two stage fusion process and its underlying fusion algorithm, as more image block adjustments are applied over time, not only does the number of ground control points continuously increase in the area of coverage, but the accuracy of those ground control points already in the area continuously improves as well.

In summary, from the above what will be appreciated is that in the past in order to obtain a ground control network, particularly one covering a large area of interest, one is faced with an extremely expensive and time consuming task of surveying ground points, assuming one even has access to the area of interest, or an almost insurmountable task of doing an extremely large simultaneous image block adjustment, with the image block adjustment involving up to thousands and thousands of images over the area of interest. Moreover, it may be that all of the images are not available. This requires delaying a simultaneous image block adjustment until all of the imagery has been obtained.

However, utilizing the subject two stage fusion process with its underlying fusion algorithm it is possible to duplicate the results of a simultaneous image block adjustment by sequentially performing image block adjustments on small overlapping areas of interest and taking the results to update a metric information network (MIN) that is applicable to the whole area of interest. Note, intermediate results for less than all the imagery provide usable updates to the metric information network.

The result of the infusion of sequential image block adjustments into the metric information network is that one can obtain the accuracy provided by an extremely large single image block adjustment, and do so in manageable chunks or segments involving conventional computer resources.

BRIEF DESCRIPTION OF THE DRAWINGS

The present invention is further described with reference to the accompanying drawings wherein.

DETAILED DESCRIPTION

Underlying Fusion Algorithm

Figure 1:
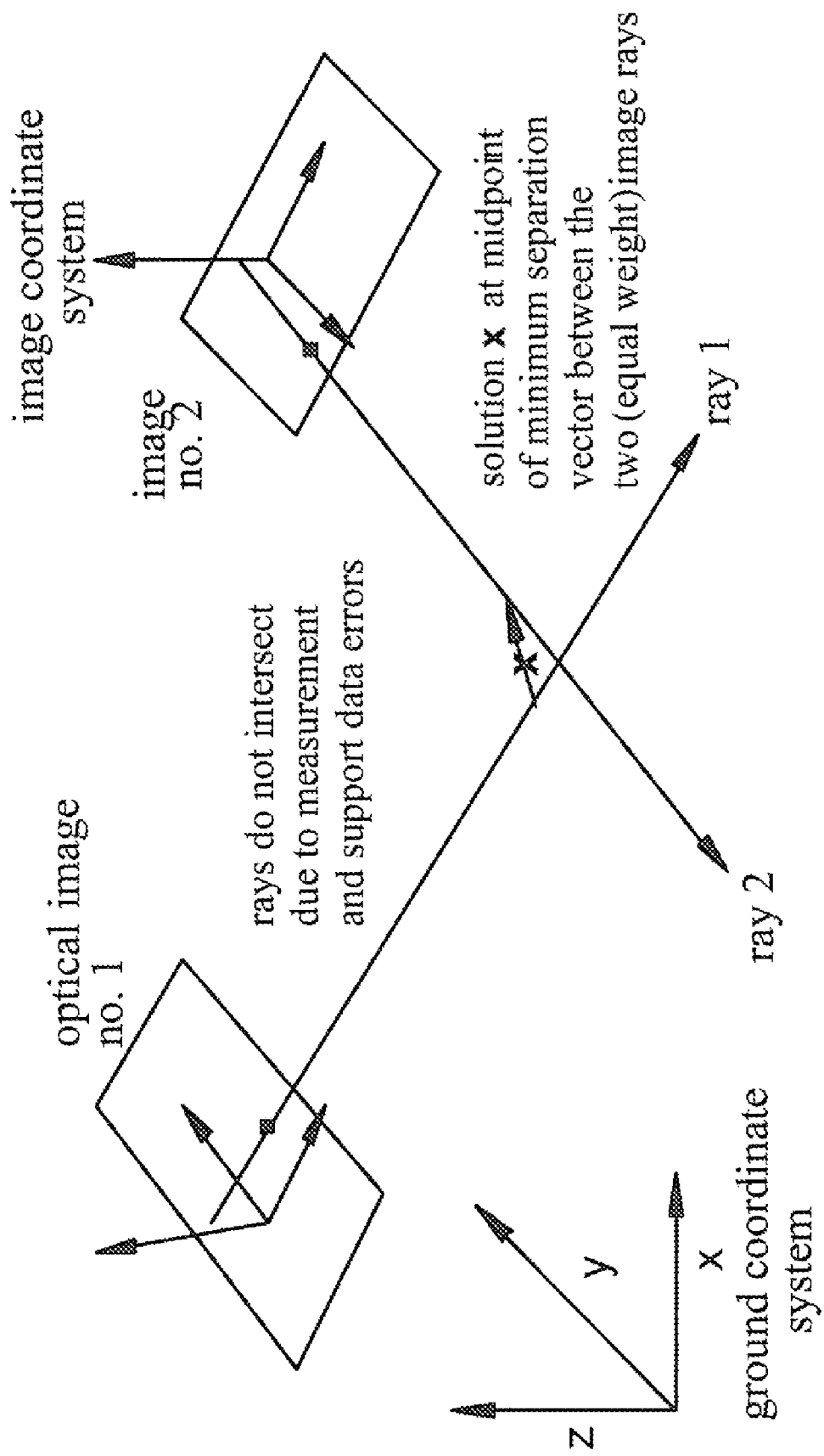
FIG. 1 is a target extraction form a stereo model overlapping image pair.

The underlying fusion algorithm for generation of the MIN is based on a "two-stage linear mean-square (LMS) estimator" derived as follows. X is defined as a mean-zero, real-valued random vector of dimension n×1, with a priori (pre-solution) covariance $P=E\{XX^T\}$. An m×1 measurement vector Z is defined as a linear function of X:

$$Z=HX+v \quad (1)$$

where H is an m×n matrix, and v is mean-zero random measurement noise vector of dimension m×1 with m×n a priori covariance $\Sigma=E\{vv^T\}$. The noise vector is assumed uncorrelated with X, i.e., $E\{Xv^T\}=0$. (Note that X and Z are jointly Gaussian distributed if X is Gaussian distributed and v is also Gaussian distributed.)

$\hat{X}$ is defined as the linear minimum mean-square (LMS) estimate of X and $P^+$ its a posteriori (post-solution) error covariance, i.e., $P^+ \equiv E\{\epsilon\hat{X}\epsilon\hat{X}^T\}$ where $\epsilon\hat{X} \equiv (X-\hat{X})$. They can be represented as follows:

$\hat{X}=GZ$, and $P^+=(I-GH)P$, where $$G=PH^T(HPH^T+\Sigma)^{-1}. \quad (2)$$

It is assumed that both P and $\Sigma$ are positive definite matrices which also implies that $(HPH^T+\Sigma)$ and $P^+$ are positive definite (invertible) matrices. $\hat{X}$ is also a best linear unbiased estimator (B.L.U.E.) and a minimum mean-square estimate when the random vectors X and Z are jointly Gaussian distributed. Note that although the above problem formulation is essentially non-sequential, the above solution equations (2) also correspond to the Kalman Filter update equations. This assumes that the predicted a priori state estimate equals zero, which is the case since all random vectors are assumed to have a mean value of zero. (Note that other equivalent formulations for the linear mean-square estimate are possible that can be more stable, but solution equations (2) serve well to derive the fusion equations of interest.) Derivations of the above estimator, including alternate forms and extensions to non-zero mean values, are discussed in P. Maybeck, *Stochastic Models, Estimation, and Control Volume* 1, Navtech Book & Software Store, 1994 (reprint) and H. Sorenson, *Parameter Estimation: Principles and Problems*, Marcel Dekker, 1980, the contents of both of which are incorporated herein by reference.

Furthermore it is assumed that the measurement Z is only a direct function of a subset of the random vector X, yet an estimate of the entire X is required:

$$Z = H_1 X_1 + v, \text{ where} \quad (3)$$

$$H = [\, H_1 \quad H_2 \,] = [\, H_1 \quad 0 \,]$$

$$X \equiv \begin{bmatrix} X_1 \\ X_2 \end{bmatrix},$$

$$P \equiv \begin{bmatrix} P_{11} & P_{12} \\ P_{21} & P_{22} \end{bmatrix},$$

and correspondingly, $$\hat{X} \equiv \begin{bmatrix} \hat{X}_1 \\ \hat{X}_2 \end{bmatrix}, P^+ \equiv \begin{bmatrix} P_{11}^+ & P_{12}^+ \\ P_{21}^+ & P_{22}^+ \end{bmatrix}.$$

$X_1$, $X_2$, $H_1$, and $H_2$ have dimensions $n_1 \times 1$, $n_2 \times 1$, $m \times n_1$, and $m \times n_2$, respectively, where $n_1 + n_2 = n$. In addition, $P_{11}$ and $P_{11}^+$ are $n_1 \times n_1$ covariance blocks, $P_{22}$ and $P_{22}^+$ $n_2 \times n_2$ covariance blocks, and $P_{12}$ and $P_{12}^+$ $n_1 \times n_2$ covariance blocks ($P_{21} = P_{12}^T$ and $P_{21}^+ = {}_{12}^{+T}$) Expanding solution equations (2):

$$\hat{X}_1 = P_{11} H_1^T (H_1 P_{11} H_1^T + \Sigma)^{-1} Z$$

$$\hat{X}_2 = P_{21} H_1^T (H_1 P_{11} H_1^T + \Sigma)^{-1} Z, \text{ and} \qquad (4)$$

$$P_{11}^+ = P_{11} - P_{11} H_1^T (H_1 P_{11} H_1^T + \Sigma)^{-1} H_1 P_{11}$$

$$P_{12}^+ = P_{12} - P_{11} H_1^T (H_1 P_{11} H_1^T + \Sigma)^{-1} H_1 P_{12}$$

$$P_{22}^+ = P_{22} - P_{21} H_1^T (H_1 P_{11} H_1^T + \Sigma)^{-1} H_1 P_{12}. \qquad (5)$$

By direct substitution, it follows that:

$$\hat{X}_2 = P_{21} P_{11}^{-1} \hat{X}_1. \qquad (6)$$

The a posteriori covariance for $\hat{X}_2$ can also be written as a function of the a posteriori covariance for $\hat{X}_1$, $$\begin{aligned}
P_{22}^+ &= P_{22} - P_{21} H_1^T (H_1 P_{11} H_1^T + \Sigma)^{-1} H_1 P_{12} \qquad (7) \\
&= P_{22} - P_{21} P_{11}^{-1} P_{11} H_1^T (H_1 P_{11} H_1^T + \Sigma)^{-1} H_1 P_{11} P_{11}^{-1} P_{12} \\
&= P_{22} - P_{21} P_{11}^{-1} (P_{11} - P_{11} + P_{11} H_1^T (H_1 P_{11} H_1^T + \Sigma)^{-1} H_1 P_{11}) \\
&\quad P_{11}^{-1} P_{12}.
\end{aligned}$$

or $$P_{22}^+ = P_{22} - P_{21} P_{11}^{-1} (P_{11} - P_{11}^+) P_{11}^{-1} P_{12}.$$

The term $(P_{11} - P_{11}^+)$ in equation (7) represents a decrease in the $X_1$ a priori covariance due to the application of the measurement Z and the term $P_{21} P_{11}^{-1} (P_{11} - P_{11}^+) P_{11}^{-1} P_{12}$ represents a corresponding decrease in the $X_2$ a priori covariance. The latter decrease is due to the a priori correlation between $X_1$ and $X_2$ as represented by P. Also by the methods above, it follows that:

$$P_{21}^+ = P_{21} - P_{21} P_{11}^{-1} (P_{11} - P_{11}^+). \qquad (8)$$

Thus, $\hat{X}_1$ (4) and $P_{11}^+$ (5) correspond to the stage 1 solution for $X_1$ of the "two-stage LMS estimator", while $\hat{X}_2$ (6) and $P_{22}^+$ (7) correspond to the stage 2 solution for $X_2$. Note that the underlying fusion algorithm described above is tailored to work with the standard inputs and outputs, i.e. state and covariance, of image block adjustments as described in the next sections.

Image Block Adjustments

Proper image block adjustments, regardless their size, are equivalent to an application of the general LMS estimator described herein. Image block adjustments are typically performed as a batch weighted least squares estimate of the image support data and all ground points measured in the images. Matrix partitioning approaches which take advantage of sparse matrices are usually employed for an efficient solution. The solution also includes the computation of the a posteriori error covariance blocks for both the image support data adjustments, and the ground point adjustments. Proper adjustments require appropriate weighting and linearization of the problem. The weights correspond inversely to the a priori accuracy (error covariance) of the unadjusted ground points, image support data estimates, and the image measurement (pixel) error of the various ground points.

The ground points involved are photo-identifiable and are of three general categories: (1) ground control points, (2) check points, and (3) tie points. Check points are ground control points with accuracy predictions set artificially low (large covariance) in order to check the quality of the solution. They do not affect the solution per se and serve no purpose in terms of MIN generation, and henceforth, are no longer referenced herein. Tie points are ground points measured in two or more overlapping images. Although their a priori ground locations are virtually unknown, their measurement in overlapping images "tie" the images together and provide a mechanism for the improvement of the image support data's relative accuracy. Note that absolute accuracy also improves through the flow of independent information, as discussed further hereafter.

Figure 2:
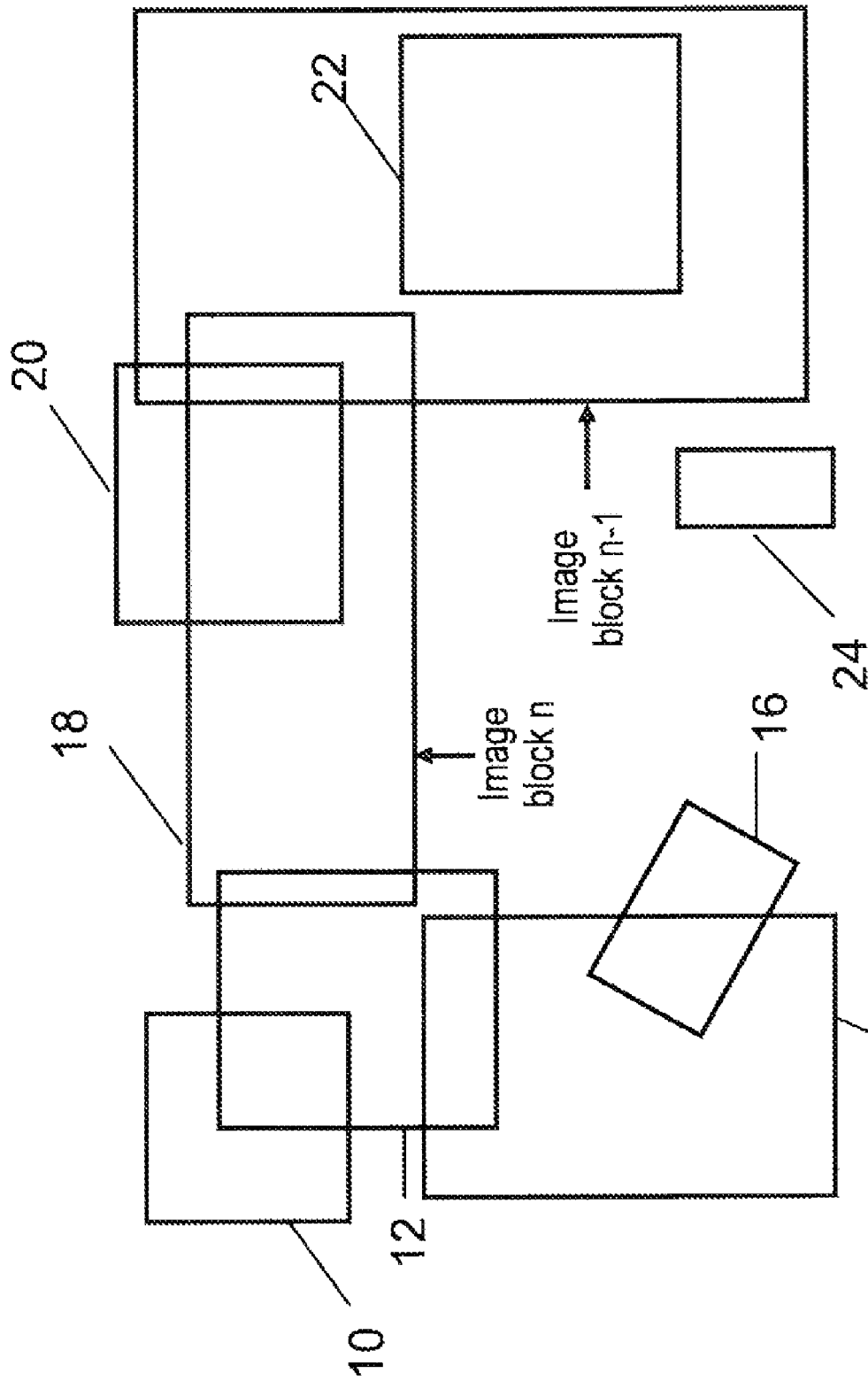
FIG. 2 are image blocks over the area of interest.

FIG. 2 shows the ground footprint of an applicable image block (adjustment) n that resides in an area of interest. Here image blocks 10-24 cover the area of interest, with 18 corresponding to block n. Each image block typically (partially) overlaps at least one other image block. As mentioned above, the ground footprints of applicable image block adjustments eventually cover the entire area of interest with a degree of redundancy.

Figure 3:
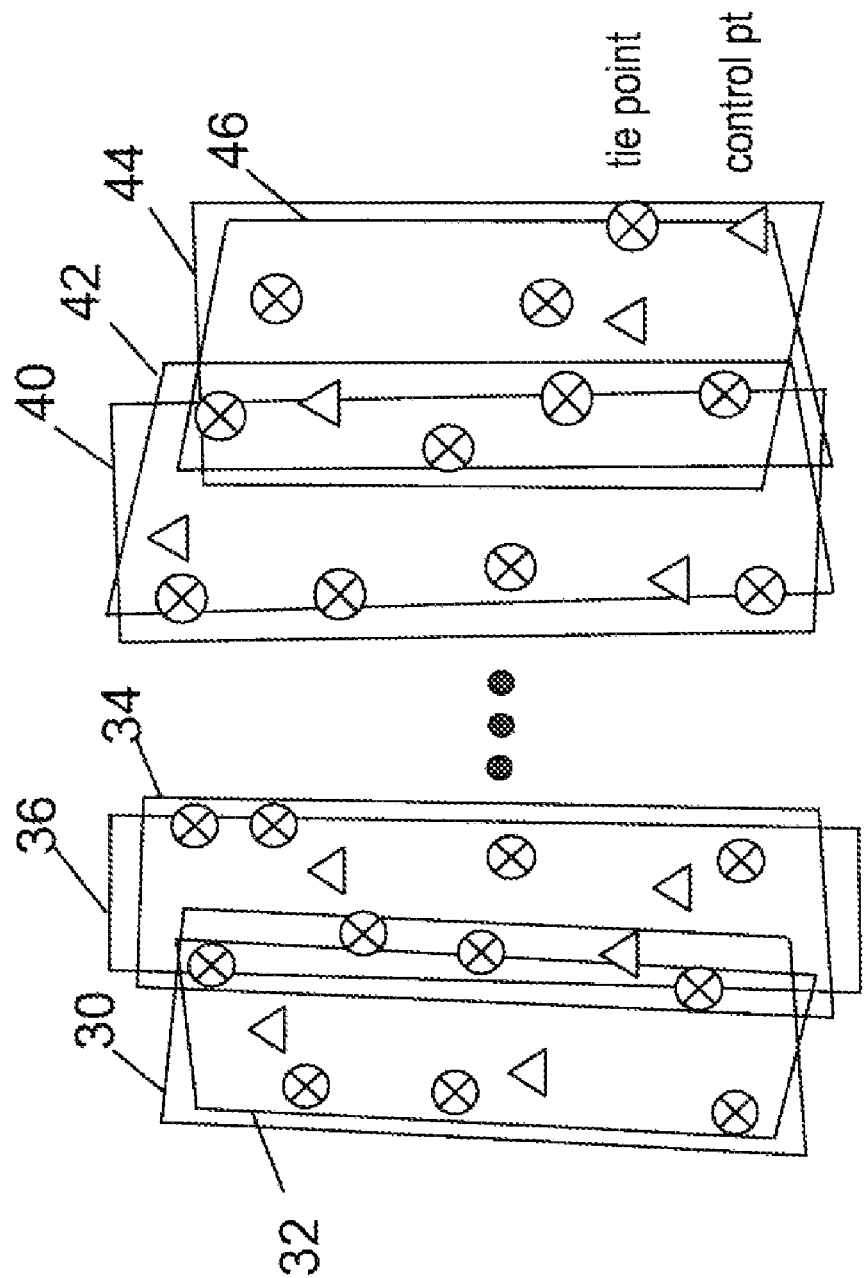
FIG. 3 are overlapping images of an image block.

FIG. 3 presents ground footprints 30-48 of overlapping images that make up a typical single image block (adjustment) and the ground points measured in it. Image blocks consist of one or more overlapping images and can be more diverse than pictured in FIG. 3, with footprints of varied orientations and sizes corresponding to a mixture of images from different sensors and sensor types (modality, e.g., EO and SAR).

Although an image block adjustment solves for a combined vector of image support data adjustments and ground point adjustments, only the ground point adjustments and their error covariance are used for generation of the MIN, or more precisely, the ground control network contained in a MIN Repository. Note that the image support data adjustments are consistent with the current updated MIN. Also, it is reasonably assumed that the a priori image support data (error) is uncorrelated with the a priori ground points, and that although the a priori image support data may be correlated between images in the same image block it is assumed uncorrelated between image blocks.

Let $X_1$ and $\hat{X}_1$ be defined as the corresponding a priori and a posteriori ground point solution vectors of the image block adjustment, and $P_{11}$ and $P_{11}^+$ their error covariances, respectively. Then, if there are a total of m1 tie points and m2 ground control points, the dimension of $X_1$ is m×1, where m=3(m1+m2). Note for the present purposes, all ground point solution vectors (estimates) X are actually adjustments ΔX based on linearization about a reference.

MIN Update

A MIN update fuses the applicable information in the image block with the MIN. It utilizes the current image block adjustment and the two-stage LMS estimator as follows. The a priori ground point solution vector for the current image block adjustment is partitioned such that $X_1 \equiv [X_{1a}^T \; X_{1b}^T]^T$, where subscript "a" corresponds to ground control points already in the MIN and subscript "b" corresponds to the other ground points (tie points).

$$P_{11} \equiv \begin{bmatrix} P_{11a} & P_{11ab} \\ P_{11ba} & P_{11b} \end{bmatrix} = \begin{bmatrix} P_{11a} & 0 \\ 0 & P_{11b} \end{bmatrix}$$

is the a priori covariance for $X_1$. Both $x_{1a}$ and $P_{11a}$ are extracted from the MIN (the latter from the MIN's multi-ground point covariance $P_{MIN}$). $P_{11b}$ is a large tie point covariance, where tie points are assumed uncorrelated with all ground control points. $\hat{X}_1 = [\hat{X}_{1a}^T \ \hat{X}_{1b}^T]^T$ is the a posteriori estimate of $X_1$ following the current image block adjustment and $$P_{11}^+ = \begin{bmatrix} P_{11a}^+ & P_{11ab}^+ \\ P_{11ba}^+ & P_{11b}^+ \end{bmatrix}$$

its a posteriori covariance. These are direct outputs from the image block adjustment.

$X_2$ is defined as all MIN ground control points not directly involved in the current image block adjustment. $P_{22}$ is the a priori covariance for $X_2$. Both are extracted from the current MIN. $P_{21} \equiv [P_{21a} P_{21b}] = [P_{21a} \ 0]$ is the a priori cross-covariance between $X_2$ and $X_1$ prior to the current image block adjustment. $P_{21a}$ is also extracted from the MIN multi-ground point covariance, i.e., $$P_{MIN} = \begin{bmatrix} P_{11a} & P_{21a}^T \\ P_{21a} & P_{22} \end{bmatrix}.$$

$\hat{X}_2$ corresponds to the a posteriori estimate of $X_2$ and $P_{22}^+$ its a posteriori covariance following the MIN update. $P_{21}^+$ is the a posteriori covariance between $\hat{X}_2$ and $\hat{X}_1$.

Given the above definitions, the two-stage LMS adjustment algorithm is directly applicable. Stage 1 corresponds to the current image block adjustment, and Stage 2 to the update of the remaining portion of the MIN. Applying (6), (7) and (8), results in:

$$\hat{X}_2 = P_{21a} P_{11a}^{-1} \hat{X}_{1a} \quad (9)$$

$$P_{22}^+ = P_{22} - P_{21a} P_{11a}^{-1} (P_{11a} - P_{11a}^+) P_{11a}^{-1} P_{21a}^T \quad (10)$$

$$P_{21}^+ = [P_{21a} - P_{21a} P_{11a}^{-1} (P_{11a} - P_{11a}^+) P_{11a}^{-1} P_{11ab}^+] \quad (11)$$

Note that following the MIN update process, the MIN now consists of:

$$X_{MIN} = [\hat{X}_1^T \ \hat{X}_2^T]^T, \ P_{MIN} = \begin{bmatrix} P_{11}^+ & P_{12}^+ \\ P_{21}^+ & P_{22}^+ \end{bmatrix},$$

and ancillary data, in which, the ground points/covariance may be re-ordered. The resultant MIN contains updates to all of its previous ground control points and the image block adjustment's a posteriori solution for the tie points as new ground control points. Note that not all tie points need to be added to the MIN.

EXAMPLES

Figure 4:
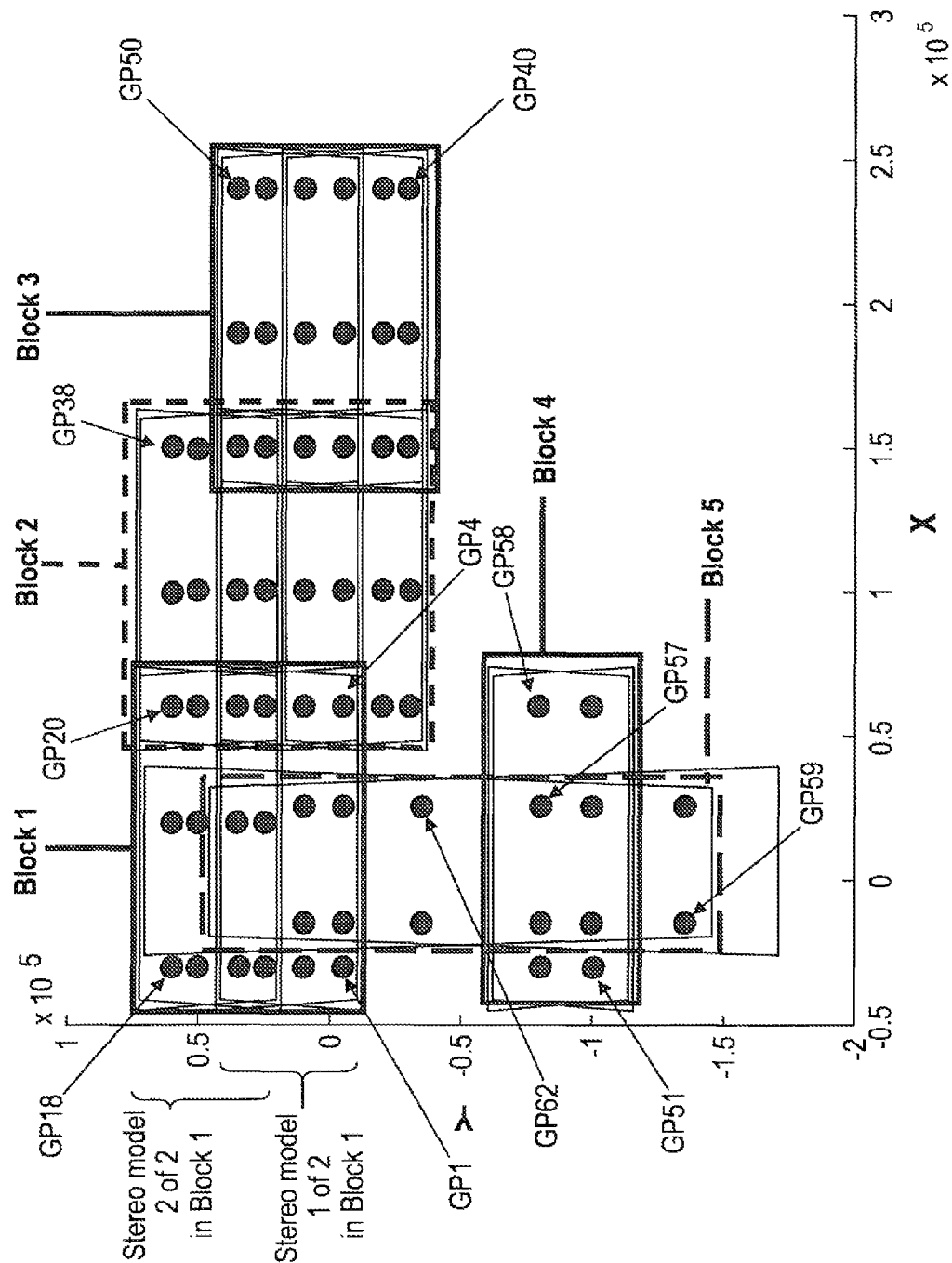
FIG. 4 are five image blocks in the area of interest.

This section describes the results of a Monte-Carlo simulation of five sequential image block adjustments and corresponding MIN updates. The image blocks are blocks 1-5 as illustrated in FIG. 4. They reside within an approximate 150 nm×150 nm area of interest, and represent the initial stages of ground control generation for this area.

The figure contains both the ground footprints of the image blocks (heavy solid and dashed lines) and the ground footprints of the individual images (light lines) that they contain as well as the locations of various ground points. There are a total of 5 image blocks, 9 stereo models (image pairs), 18 images, and 62 unique three-dimensional (3-D) ground points.

Note that the 5 block example above serves to illustrate the overall concept of the MIN and MIN update. The documented accuracies of the ground control points presented later in this section will differ from a real application in that accuracies in a real application will typically be much better assuming any combination of more image blocks, more images per block, more accurate a priori image support data, smaller ground-sample-distance (GSD) or better image resolution.

Block 1 contains two partially (50%) overlapping stereo models. Each stereo model consists of two overlapping images, thus block 1 contains four images. Block 1 also contains 20 ground points (GP1-GP20). Each was measured in either two or four images from block 1, depending on their location and image overlap. Block 2 consists of six images from three partially overlapping stereo models, and contains 24 ground points, each of which was measured in either two or four images from block 2. Six of these ground points (GP4, GP8, GP11, GP14, GP17, and GP20) are also common with block 1, and hence, were measured in a total of either six or eight images from blocks 1 and 2. This same general pattern continues for image blocks 3-5. The latter two blocks consist of one stereo model each. Note that the images making up image block 5 are larger than the other images and are oriented N-S instead of E-W. Image block 5 contains 14 ground points, 4 unique to block 5, 4 in common with block 4, and 6 in common with block 1.

Imaging geometry for all images corresponds to 30 degrees off-nadir in the along track (N-S) direction with a 60 degree convergence angle for stereo pairs. Sensor height was 400000 m. Also, image measurement errors were simulated consistent with a ½ pixel standard deviation of error in each image coordinate, and uncorrelated between measurements.

The image measurements and image support data for each of the above images was simulated corresponding to an optical frame sensor with a three meter focal length used to emulate an EO scanning sensor. There are seven adjustable parameters corresponding to each image: three for sensor position, three for sensor attitude, and one for focal length. All image support data errors were simulated consistent with their a priori error covariance, including temporal correlation model, summarized in Table 1.

TABLE 1

Image and image support data characteristics

| | Blocks 1-4 | | Block 5 | |
|---|---|---|---|---|
| Image size (line × sample) | 50k × 20k | | 80k × 25k | |
| GSD (m) | 2.5 | | 2.5 | |
| in track position (sigma (m) T (sec)) | 6 | 2000 | 12 | 2000 |
| cross track | 10 | 3000 | 20 | 3000 |
| radial | 4 | 1000 | 8 | 1000 |
| alpha attitude (sigma (urad) T (sec)) | 15 | 200 | 30 | 200 |
| beta | 15 | 100 | 30 | 100 |
| kappa | 100 | 300 | 200 | 300 |
| focal length (sigma (mm) T (sec)) | 0.3 | 5000 | 0.6 | 5000 |

Image support data errors are uncorrelated between blocks, but temporally correlated for stereo pairs in the same block. Table 1 contains the a priori image support standard deviation of error ("sigma") for each of the seven adjustable parameters, the image size, and the approximate image pixel GSD as a function of image block. The temporal correlation model was Gaussian with time constant T seconds. There were 80 seconds between images in a stereo pair.

The simulated operational scenario for image block adjustments was as follows. Image block adjustment 1 was performed first for the image support data and ground points measured in block 1. The MIN was assumed empty at the start of this block adjustment and provided no ground control points. Following the adjustment of image block 1, the a posteriori solutions for its tie points and corresponding full error covariance were placed into the MIN as ground control points. Next, those points now in the MIN and also common to block 2 served as a priori ground control for the second image block adjustment. Following image block adjustment 2, its a posteriori solution (adjustment) of the ground control points as well as block 2's tie points were placed into the MIN with their full error covariance. A MIN update was then performed which updated all other MIN points not in block 2, their error covariance, and the cross-covariance between these MIN points and the new or updated MIN points. This process was continued for the remaining three blocks.

1. Baseline results

Table 2 presents the typical CE/LE (meters) for a ground point as a function of image block and step into the operational scenario. The first row reflects (stereo) extraction accuracy of unadjusted image support data. Row i in the table reflects the status at the end of the MIN update immediately following image block adjustment i−1. CE and LE represent the 90% horizontal accuracy and 90% vertical accuracy of a ground point's geo-location, computed from the ground point's 3×3 error covariance block from the full a posteriori error covariance in the MIN. Note block 5's role in the flow of information. It "connects" blocks 1-3 with block 4. In particular, prior to image block adjustment 5 and the corresponding MIN update, block 4 is isolated. Also, although Table 2 presents absolute accuracies only, relative accuracies also improve during the operational scenario. After the last MIN update, the typical 90% relative accuracy between a point in block 1 and a point in block 3 has improved from relCE/relLE=35/25 meters (no adjustments) to 11/6 meters.

TABLE 2

Absolute accuracy (CE/LE) (m) versus image block adjustment/MIN update

|  | Block 1 | Block 2 | Block 3 | Block 4 | Block 5 |
| --- | --- | --- | --- | --- | --- |
| no adj | 25/15 | 25/15 | 25/15 | 25/15 | 50/28 |
| block 1 adj | 22/14 | | | | |
| block 2 adj | 14/8 | 13/8 | | | |
| block 3 adj | 12/8 | 11/7 | 13/8 | | |
| block 4 adj | 12/8 | 11/7 | 13/8 | 23/14 | |
| block 5 adj | 11/7 | 10/6 | 12/8 | 12/8 | 12/8 |

Figure 5:
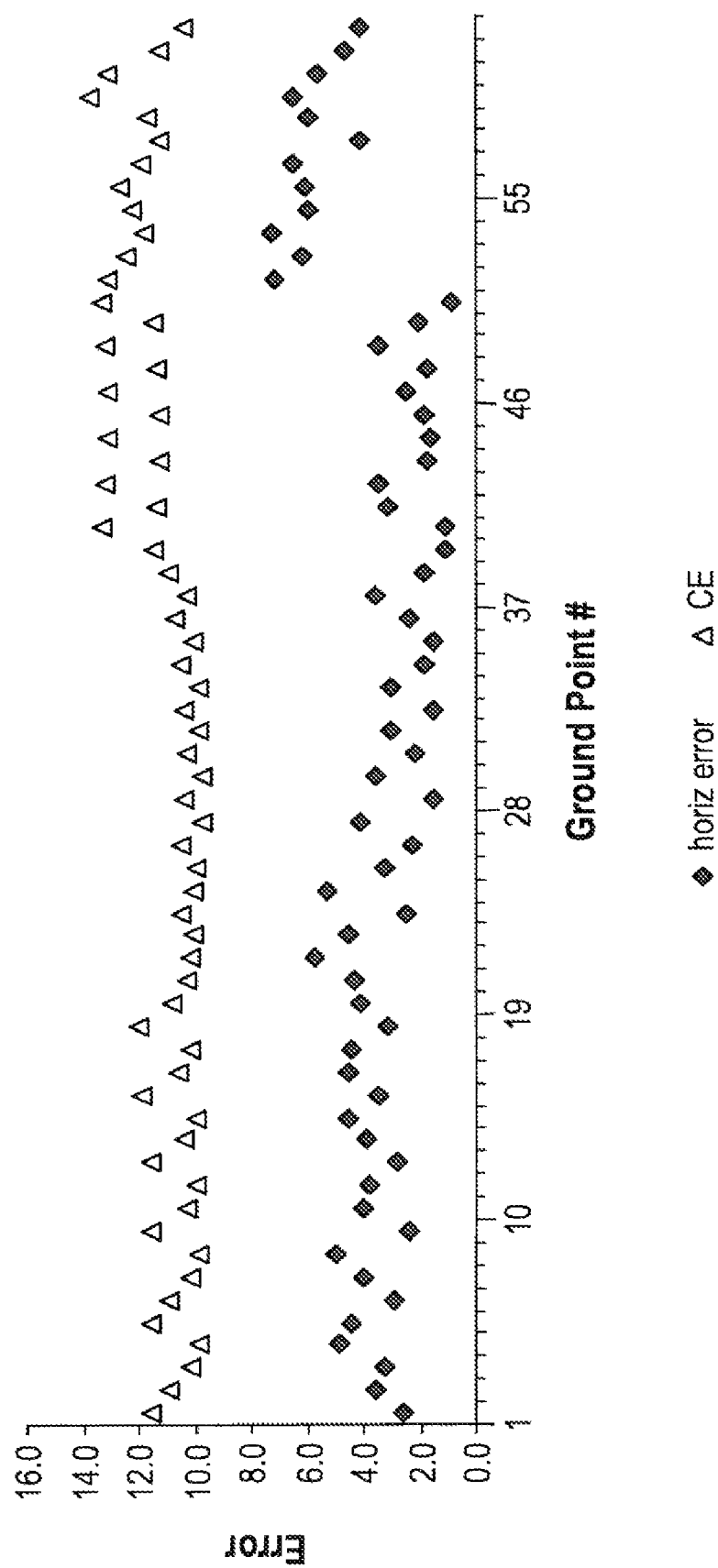
FIG. 5 is a graph showing ground point horizontal radial error (m) and corresponding CE (m) accuracy prediction.
Figure 6:
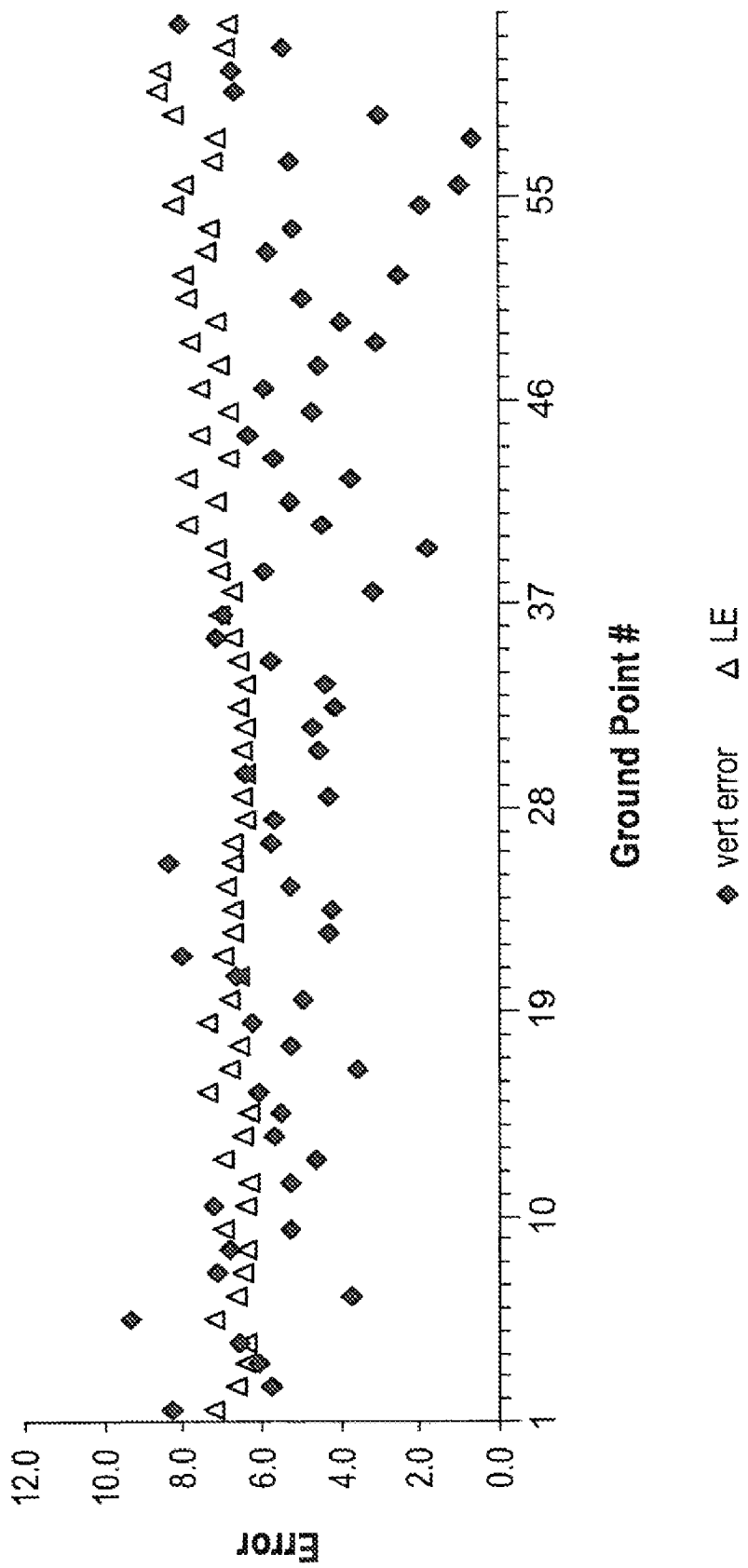
FIG. 6 is a graph showing ground point absolute vertical error (m) and corresponding LE (m) accuracy prediction.

FIGS. 5 and 6 present the horizontal and vertical ground point errors, respectively, for all ground points contained in the MIN after the last MIN update. These errors are relative to simulated truth. The figure also contains the corresponding CE or LE 90% accuracy predictions computed from the multi-ground point error covariance contained in the MIN. Errors are depicted by diamonds and accuracy predictions by triangles in the figure.

Figure 7:
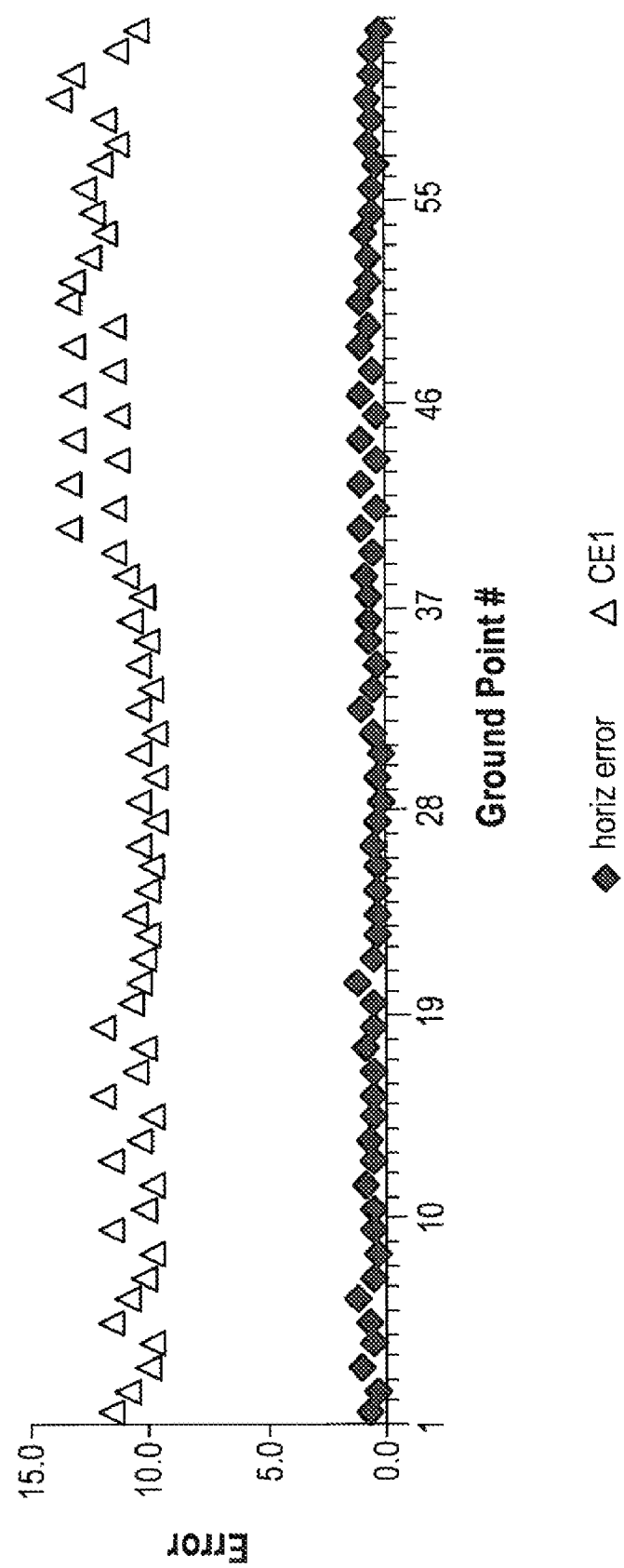
FIG. 7 is a graph showing ground point horizontal radial difference (m) between single large solution and final results of MIN update approach (CE's are identical)
Figure 8:
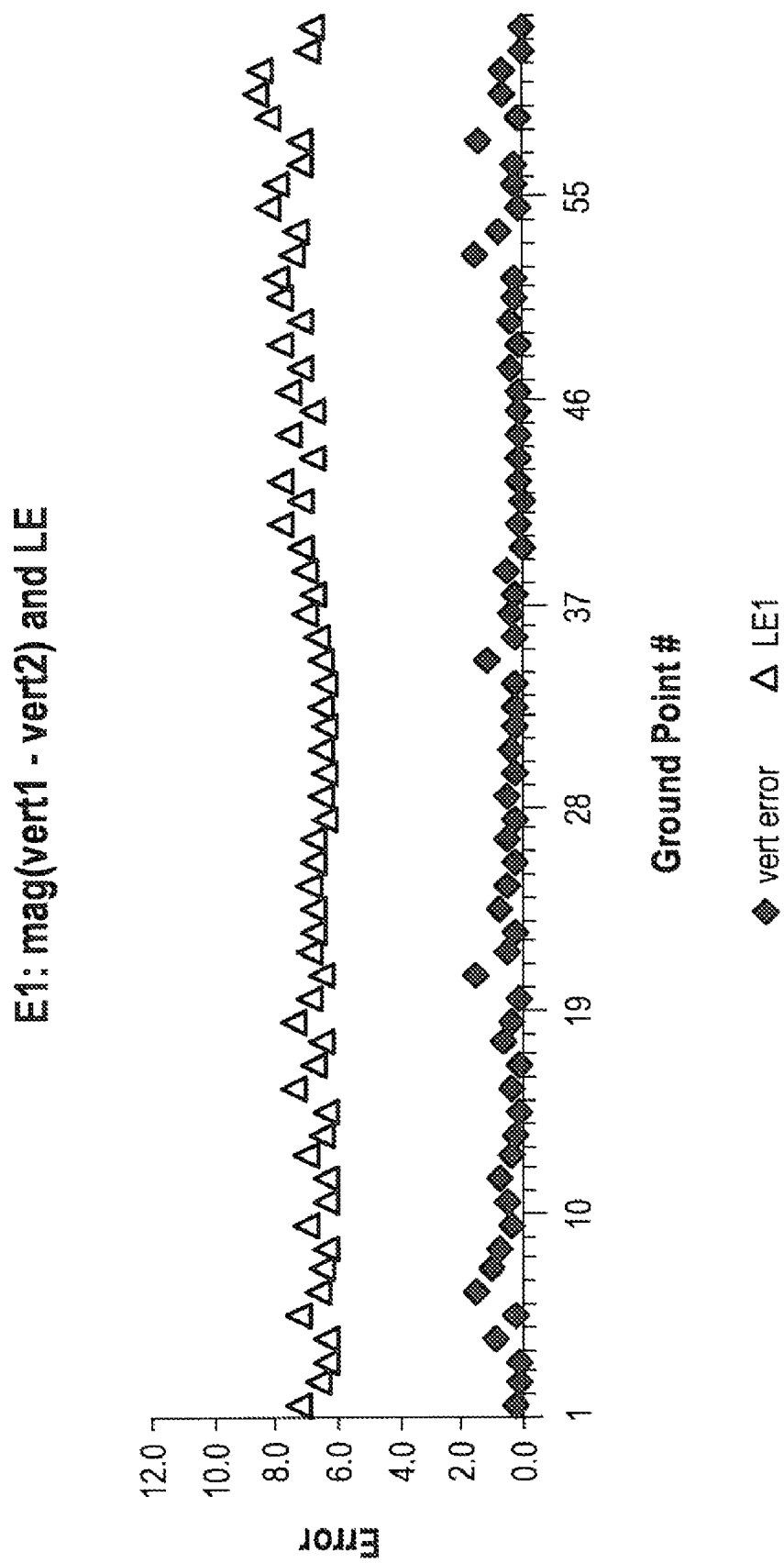
FIG. 8 is a graph showing absolute vertical difference (m) between single large solution and final results of MIN update approach (LE's are identical)

In order to demonstrate that the overall MIN update procedure is optimal, the five sequential image block adjustments were also performed simultaneously in one simultaneous LMS adjustment involving all images and all ground points (individual image block adjustments and MIN updates were not performed). These points were all tie points prior to this large adjustment, and were all ground control points (with full multi-ground point error covariance) inserted into the MIN following this adjustment. FIGS. 7 and 8 compare the final result of the MIN update approach to this single adjustment. Errors are defined as differences between the two approaches for each ground point. The corresponding CE and LE estimates between the two approaches were identical, and their common value only included for comparison to the geo-location differences.

Note that results for the two approaches were virtually identical. However, operationally, the MIN update approach involving smaller (sequential) image block adjustments is more practical. (For this example, the single solution simultaneously solves for 18×7 image adjustable parameters and 62×3 ground point coordinates (311 element solution vector). The largest image block adjustment (block 3) with the MIN update approach simultaneously solves for 6×7 image adjustable parameters. and 24×3 ground point coordinates (114 element solution vector). Finally, the single solution also serves to directly illustrate the effects of tie points on absolute accuracy. That is, they allow for improved solution absolute accuracy by allowing for the "flow" of independent information between the various images' a priori image support data values, in an "averaging" of and corresponding reduction in image support data errors and ultimately ground point errors.

2. Results Using External Control and Other Experiments

Figure 9:
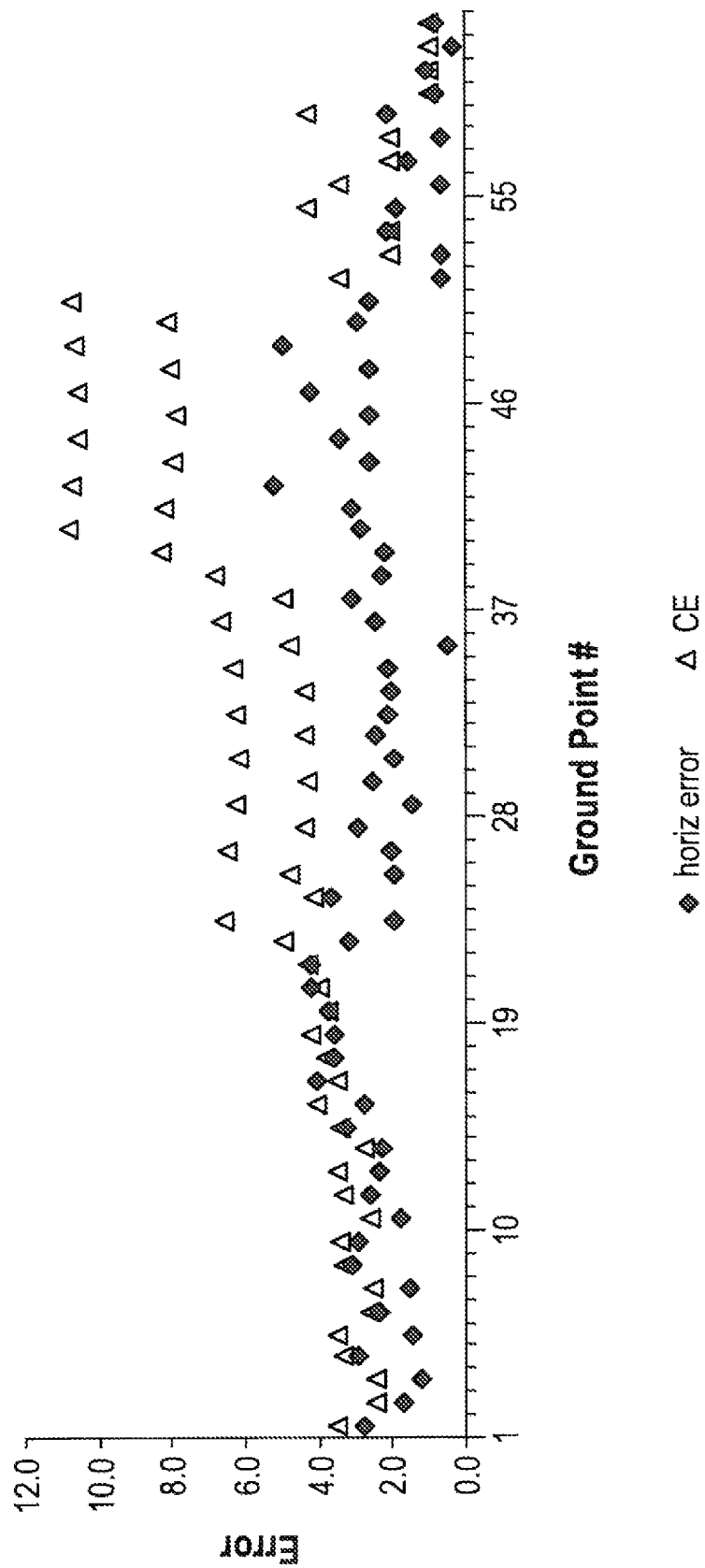
FIG. 9 is a graph showing ground point horizontal radial error (m) and corresponding CE (m) using external control.
Figure 10:
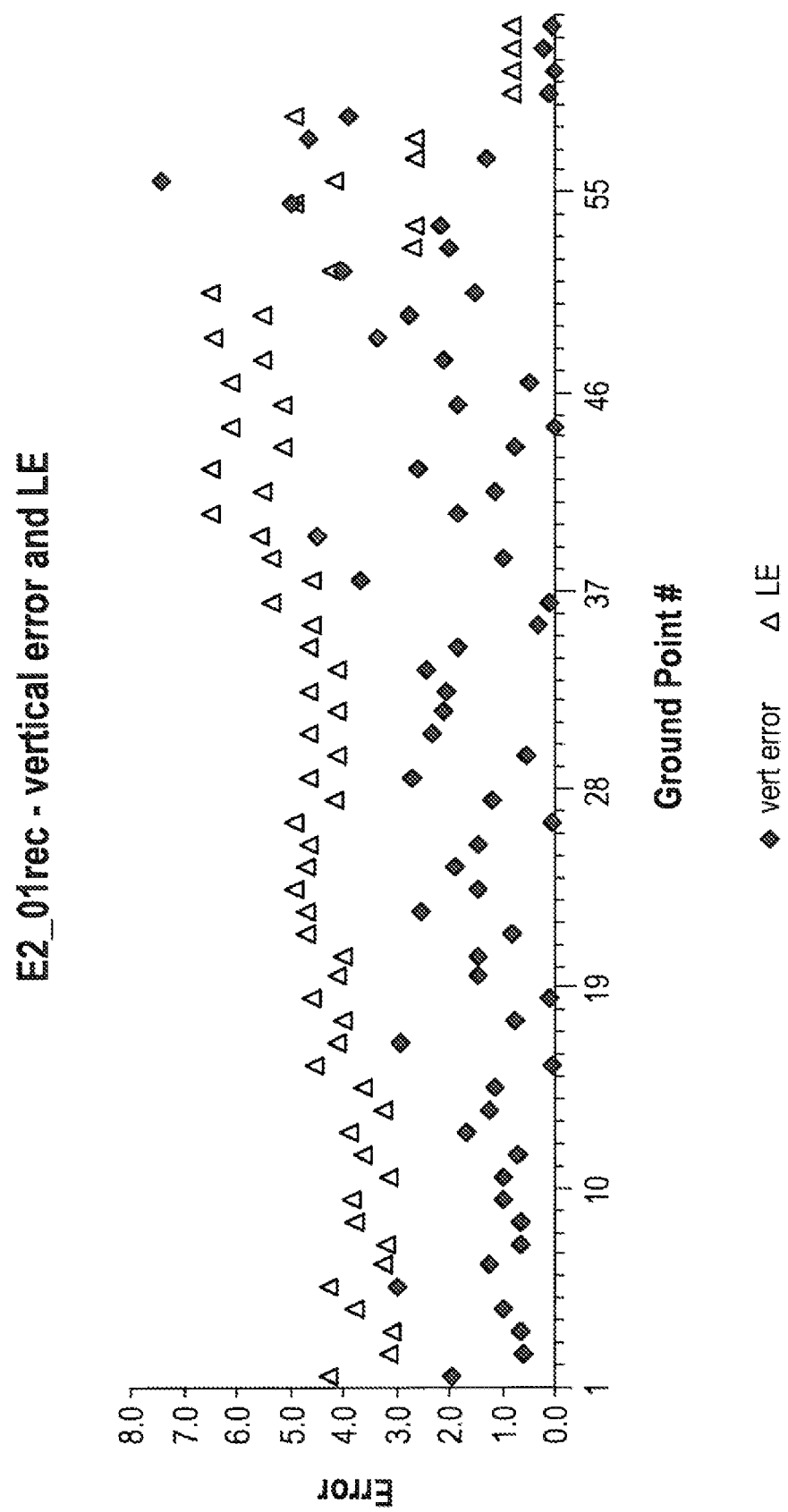
FIG. 10 is a graph showing ground point absolute vertical error (m) and corresponding LE (m) using external control.

The first experiment was repeated with the following difference. The four ground points exclusive to block 5 (GP59-GP62) were changed to external surveyed (GPS) control points with 1 meter CE/LE predicted accuracy. They were placed in the MIN anytime prior to the block 5 image adjustment as ground control points uncorrelated with all other points currently in the MIN. Table 3 and FIGS. 9 and 10 present the corresponding results. Note that the addition of the external ground control points improved overall accuracy, with improvements diminishing for points further away (blocks 2 and 3). Results were also compared to a large, single adjustment and found to be virtually identical.

TABLE 3

Absolute accuracy (CE/LE) (m) versus image block adjustment/MIN update and with the availability of external control

|  | Block 1 | Block 2 | Block 3 | Block 4 | Block 5 |
| --- | --- | --- | --- | --- | --- |
| no adj | 25/15 | 25/15 | 25/15 | 25/15 | 50/28 |
| block 1 adj | 22/14 | | | | |
| block 2 adj | 14/8 | 13/8 | | | |
| block 3 adj | 12/8 | 11/7 | 13/8 | | |
| block 4 adj | 12/8 | 11/7 | 13/8 | 23/14 | |
| block 5 adj | 3/3 | 5/5 | 9/6 | 3/4 | 3/4 |

This completes the detailed description of the two major experiments based on simulated data. Note, however, additional and related experiments were also performed. The first verified that the order in processing the image block adjustments/MIN updates had virtually no affect on the final solution of the above two experiments. The second augmented the first experiment with an additional image block 6 that overlapped image block 3's eastern boundary. This image block consisted of 12 stereo pairs or 24 additional images, and 72 additional 3-D ground points. Results were consistent with the first two experiments. However, the overall ground point accuracies improved due to the additional information from the additional image block.

Following the above experiments, a completely new set of experiments was also performed that involved a different simulation layout (image blocks and sensor characteristics) as well as the use of actual commercial satellite imagery. These experiments were also successful and documented in the published paper Dolloff, John, M. Iiyama and R. Settergren, "A New and Efficient Method for the Generation of a Ground Control Network with a Large Area of Coverage", Proceedings from the ASPRS Annual Conference, Portland, Oreg., Apr. 28-May 2, 2008. The paper also summarizes the MIN concept as applied to commercial satellite imagery in general, and the experiments indicate that a MIN with worldwide coverage and 1 meter ground control point accuracy is feasible. The paper also presents equations mathematically equivalent to 9-11, but without the assumption that ground point outputs of the stage 1 image block adjustment are deltas to ground point reference values, as opposed to estimates of their entire (summed) values, i.e., all ground point solution vectors (estimates) X in the paper correspond to total ground point location as opposed to adjustments $\Delta X$ to reference values.

Operational Implementation

MIN Repository storage requirements are dominated by the ground control points' error covariance. Maximum requirements occur when all ground control points are correlated (no isolated image blocks during their generation). Storage of the error covariance corresponds to the storage of approximately $(3n)^2/2$ double precision numbers, where n is the number of three-dimensional ground control points. Thus, for example assuming 10000 correlated points, approximately 5E8 double precision numbers are stored, or equivalently, 4 gigabytes (Gbytes) of storage–a small amount for today's computer systems. Note that at an average spacing of 5 miles between points in each of two directions, 10000 points cover a 500 mile×500 mile area of interest.

Throughput requirements for the sequential generation of a MIN are dominated by MIN update time when the number of correlated ground points currently in the MIN is largest. The dominant calculation (see (7) or (10)) is the multiplication of an 3n×3m matrix by its transpose, where n is the number of ground control points currently in the MIN and m is the number of those ground control points used in the latest image block adjustment. The resultant calculation is on the order of $(27n^2m)$ double precision multiplies.

The above MIN throughput requirements are reasonable assuming up to 10000 correlated ground control points, and are much less than corresponding requirements for a simultaneous multi-block adjustment approach. For example, assuming a total of 200 image blocks of commercial satellite imagery are processed in order to generate 10000 three-dimensional ground control points, each image block containing 10 stereo pairs (20 images), it takes approximately 14 hours of total CPU time to sequentially process all 200 blocks with the MIN approach, versus up to 20 days of CPU time for the simultaneous approach. In addition, the MIN processing of the 200 blocks takes place incrementally over the time period required to gather all 200 image blocks. The average processing time for each of these blocks is only 4 minutes of CPU time. These numbers are based on operation count estimates and assume a single 1200 Mhz CPU, sufficient internal memory or RAM (on the order of 8 Gbytes), and exclude image measurement time for the ground points which is common to both approaches. Further details can be found in (Dolloff, Iiyama, and Settergren).

Thus, both storage and throughput requirements corresponding to the MIN approach are easily satisfied by commercial-off-the-shelf computer systems that are readily available today. If a MIN (Repository) is to be generated containing significantly more than 10000 three-dimensional ground points, it is partitioned into "sub-MINs" that contain a limited number of points each, on the order of 10000. More specifically, the actual area of interest is partitioned into smaller overlapping sub-areas, each with its own sub-MIN. If an image block adjustment is to update the MIN, it is used to independently update each sub-MIN that intersects the image block's ground footprint. The overlap between the sub-MINs helps to insure continuity across the MIN. If an application requires a set of ground control points unique to a sub-MIN, the corresponding points and error covariance are obtained (extracted) exclusively from that sub-MIN. If the set corresponds to an intersection area between sub-MINs, one sub-MIN or the other can be consistently selected. Further discussion is provided in (Dolloff, Iiyama, and Settergren), which also describes other approaches; however, the sub-MIN approach described above is the preferred approach. With this approach, and assuming a MIN consisting of k(10000) ground control points, MIN throughput requirements and MIN internal memory storage requirements are on the order of those required for a MIN with 10000 correlated ground points, and MIN external (disk) storage requirements are on the order of k times the external storage requirements for 10000 correlated ground points. Of course, these storage requirements are for the MIN Repository itself. Any data transferred from the MIN Repository for use by an arbitrary image exploitation application, and hence its storage, is orders of magnitude less, since the application typically requires only 20 ground control points or less to cover its much smaller area of interest.

In summary, a methodology and fusion algorithm for the sequential generation of a ground control network (MIN) from image block adjustments have been described, and numerous examples presented verifying their corresponding feasibility and optimal performance. In addition, implementation of a very large MIN has been described, and the significant throughput advantage of the sequential MIN approach over a single, simultaneous, multi-block adjustment has been detailed.

Figure 11:
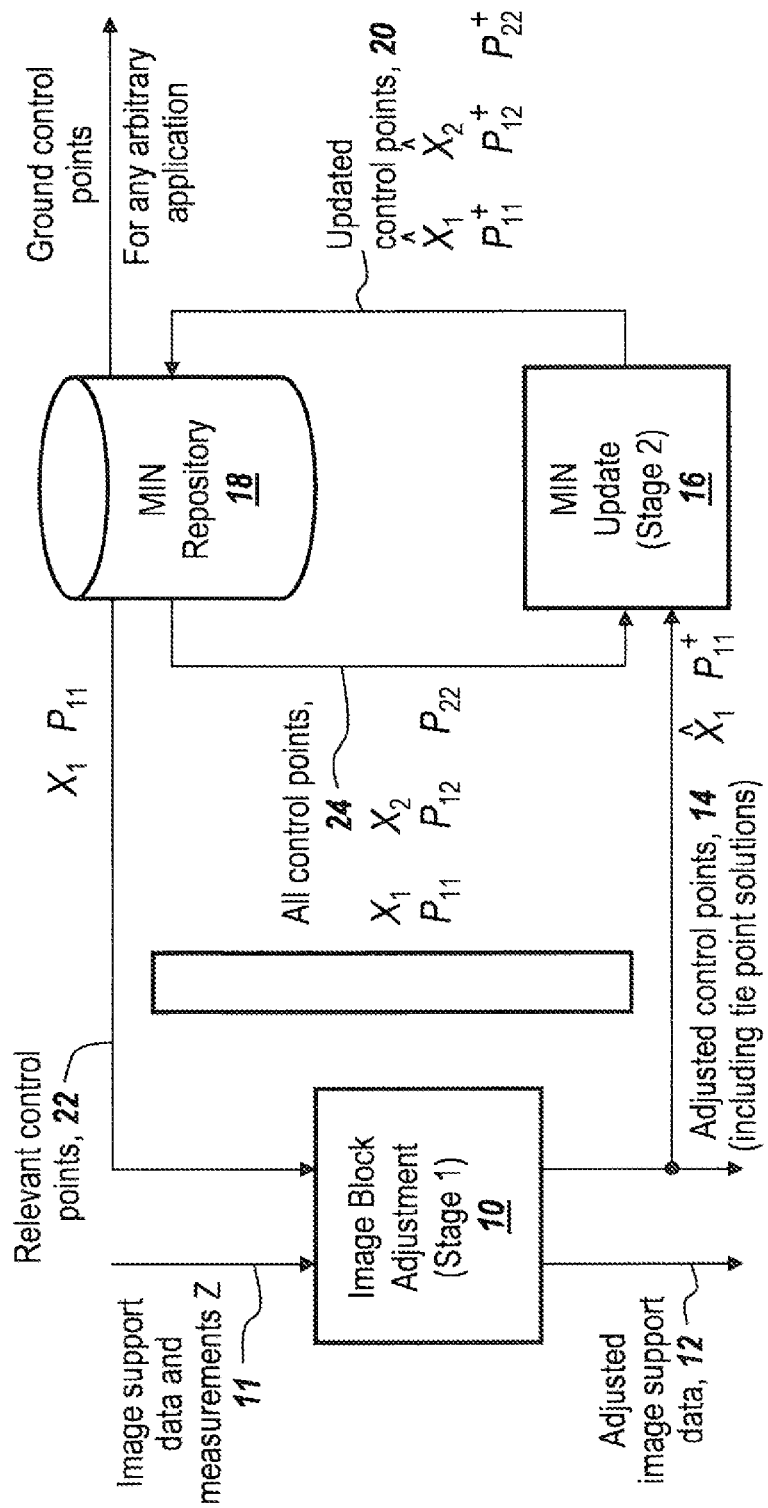
FIG. 11 depicts the fusion of new image block information with the current MIN, i.e., the two stage fusion process, where MIN data is stored in a MIN Repository and is available to arbitrary applications as well as the current image block adjustment.

Referring now to FIG. 11, what is described is the fusion of new image block information with current data in a metric information network using sequential image block adjustments to cover large areas using minimal computer resources, i.e., the two stage fusion process. The result is the equivalent to a simultaneous, extremely large image block adjustment.

As can be seen, the Stage 1 a prior image block adjustment is shown at 10 which performs an image block adjustment using image support data and image measurements of ground points 11 inputted for this block.

The output of image block adjustment 10 is adjusted image support data 12 and adjusted ground control points 14, including tie points. The adjusted control points are input to the Stage 2 MIN update module 16 which takes these adjusted control points and information from the MIN Repository 18 to provide updated control points 20 that are fed back into MIN Repository 18.

In Stage 1, not only does the image block adjustment rely on image support data and measurements 11, it also requires relevant control points 22 and their error covariance from MIN Repository 18.

It will also be seen that in order for the Stage 2 MIN update or fusion process to occur, all control points 24 and their covariances are inputted to the Stage 2 MIN update module.

As each image block adjustment is performed, the results are fused with other image block adjustment results so that the control points in the MIN Repository are constantly being updated and are constantly being made more accurate.

What has been accomplished is to rapidly and efficiently provide a set of accurate ground control points to aid any image exploitation (e.g. target extraction or image block adjustment) application or process. The fusing system is therefore able to support any image exploitation process because it generates accurate ground control points for large areas whose large numbers of images are not readily processable when employing a simultaneous image block adjustment for the generation of ground control points.

The result is that any image exploitation process which seeks to generate accurate ground points from any corresponding points in an image can use the large number of accurate ground control points generated by the subjection fusion process to greatly improve ground point accuracy.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for fusion of image block adjustments for the generation of a ground control network, constituting a metric information network comprising the steps of:
    (a) providing a plurality of image blocks including a first image block, each of said image blocks have a plurality of images generated from airborne or space borne sensors;
    (b) providing an image block adjustment of the first image block to solve for the improved image support data and geo-coordinates of the ground tie points measured in the images of the first image block to create adjusted ground tie point ground coordinates with error covariance;
    (c) incorporating the adjusted ground tie point ground coordinates and their error covariance into the metric information network as new ground control points;
    (d) providing another image block which partially overlaps the first image block and then measuring new ground tie points in this second image block and bringing in any ground control points in the metric information network that can be measured in the images of the second image block,
    (e) performing an image block adjustment of the second image block and taking the adjusted ground tie points of step (c) and their error covariance and placing them into the metric information network as new ground control points; and
    (f) within the metric information network replacing the control points used in the second image block adjustment with their adjusted counterparts and error covariance, and then updating all other ground control points currently in the metric information network with a fusion algorithm.

2. The method of claim 1, wherein steps (a)-(f) are repeated to add new points to the metric information network for any remaining image blocks.

3. A method of obtaining ground control points covering a large area of interest, comprising the steps of:
    utilizing a two stage fusion process with an underlying fusion algorithm to duplicate the results of a single image block adjustment that covers the large area of interest by sequentially performing image block adjustments on small overlapping areas of interest; and,
    taking the results of the sequentially-performed image block adjustments to update a metric information network that is applicable to the large area of interest, whereby the results of the sequential image block adjustments when imported into the metric information network provide the accuracy obtainable using a single image block adjustment for the corresponding large area of interest.

4. The method of claim 3, wherein intermediate results in the two stage fusion process provides usable updates to the metric information network.

5. In a method of obtaining ground control points covering a large area of interest, comprising the steps of utilizing a two stage fusion process with an underlying fusion algorithm to duplicate the results of a single image block adjustment that covers the large area of interest by sequentially performing image block adjustments on small overlapping areas of interest, and, taking the results of the sequentially-performed image block adjustments to update a metric information network that is applicable to the large area of interest, whereby the results of the sequential image block adjustments when imported into the metric information network provide the accuracy obtainable using a single image block adjustment for the corresponding large area of interest, a method for fusion of image block adjustments for the generation of a ground control network, constituting a metric information network comprising the steps of:
    (a) providing a plurality of image blocks including a first image block, each of said image blocks have a plurality of images generated from airborne or space borne sensors;
    (b) providing an image block adjustment of the first image block to solve for the improved image support data and geo-coordinates of the ground tie points measured in the images of the first image block to create adjusted ground tie point ground coordinates with error covariance;
    (c) incorporating the adjusted ground tie point ground coordinates and their error covariance into the metric information network as new ground control points;
    (d) providing another image block which partially overlaps the first image block and then measuring new ground tie points in this second image block and bringing in any ground control points in the metric information network that can be measured in the images of the second image block,
    (e) performing an image block adjustment of the second image block and taking the adjusted ground tie points of step (c) and their error covariance and placing them into the metric information network as new ground control points; and
    (f) within the metric information network replacing the control points used in the second image block adjustment with their adjusted counterparts and error covariance, and then updating all other ground control points currently in the metric information network with a fusion algorithm.

6. The method of claim 5, wherein steps (a)-(f) are repeated to add new points to the metric information network for any remaining image blocks.

7. The method of claim 5, wherein intermediate results in the two stage fusion process provides usable updates to the metric information network.

* * * * *